United States Patent
Caceres

(10) Patent No.: US 10,302,059 B2
(45) Date of Patent: May 28, 2019

(54) FILTER FOR A FUEL INJECTOR

(71) Applicant: Caterpillar Inc., Peoria, IL (US)

(72) Inventor: Diego Caceres, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 177 days.

(21) Appl. No.: 15/413,951

(22) Filed: Jan. 24, 2017

(65) Prior Publication Data

US 2018/0209390 A1 Jul. 26, 2018

(51) Int. Cl.
*F02M 61/16* (2006.01)
*B01D 29/58* (2006.01)
*F02M 37/22* (2019.01)

(52) U.S. Cl.
CPC .......... *F02M 61/165* (2013.01); *B01D 29/58* (2013.01); *F02M 37/22* (2013.01); *B01D 2201/184* (2013.01); *F02M 2200/27* (2013.01)

(58) Field of Classification Search
CPC .. F02M 61/165; F02M 37/22; F02M 2200/27; B01D 29/58; B01D 2201/184
USPC .................... 210/338, 471, 458, 495, 497.01
See application file for complete search history.

(56) References Cited

U.S. PATENT DOCUMENTS

| 7,041,217 B1 | 5/2006 | Close et al. |
| 2011/0174704 A1* | 7/2011 | Yamada ................ B01D 29/01 210/137 |
| 2016/0220926 A1 | 8/2016 | Caceres |

FOREIGN PATENT DOCUMENTS

| DE | 102006047557 | 4/2008 |
| DE | 102007050447 A1 | 4/2009 |
| DE | 10201301802 A1 | 8/2014 |
| DE | 102013203071 A1 | 8/2014 |
| EP | 0880985 | 12/1998 |
| EP | 1382807 A1 | 1/2004 |
| GB | 293668 | 7/1928 |
| WO | 2016122829 | 8/2016 |

* cited by examiner

*Primary Examiner* — Madeline Gonzalez
(74) *Attorney, Agent, or Firm* — Miller, Matthias & Hull

(57) ABSTRACT

A fuel injector filter is disclosed. The filter may include an inner ring concentrically surrounded by an outer ring. The inner ring may radially extend between an inner ring inner perimeter and an inner ring outer perimeter, and comprise a first port radially extending between the inner ring inner perimeter and the inner ring outer perimeter. The outer ring may radially extend between an outer ring inner perimeter and an outer ring outer perimeter, and comprise a first aperture radially extending between the outer ring inner perimeter and the outer ring inner perimeter. The first aperture may be circumferentially offset from the first port. A filtration channel may radially extend between the inner ring outer perimeter and the outer ring inner perimeter and be configured to impede movement of a particle toward the first port.

16 Claims, 11 Drawing Sheets

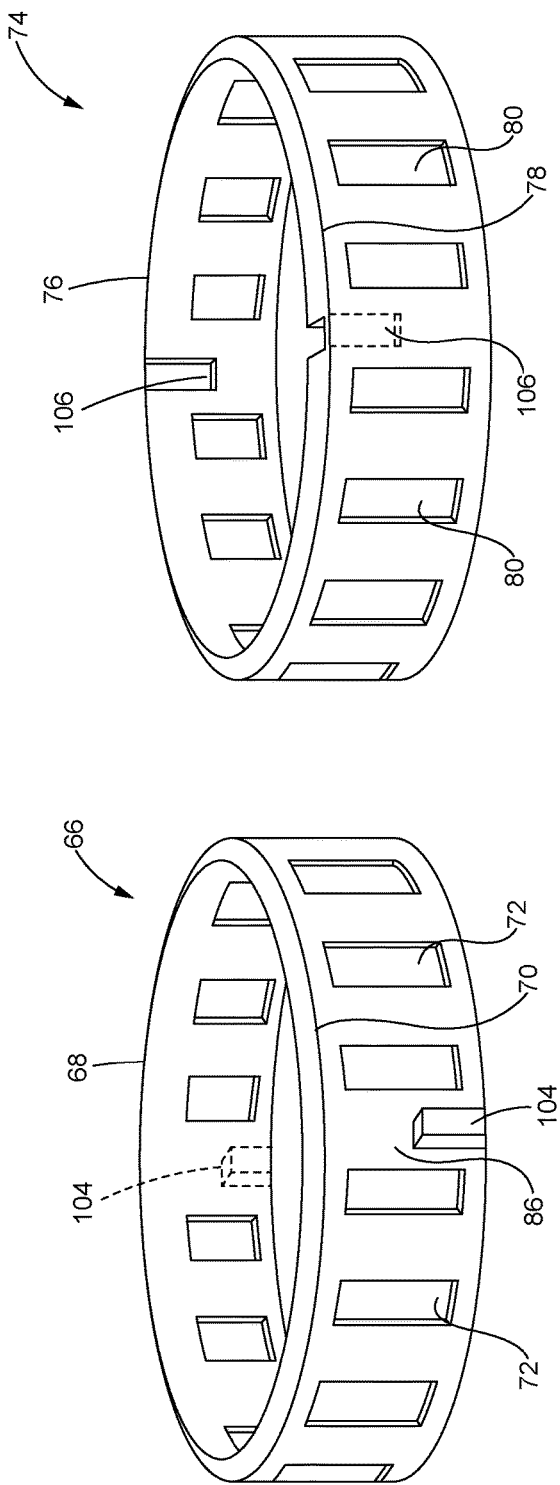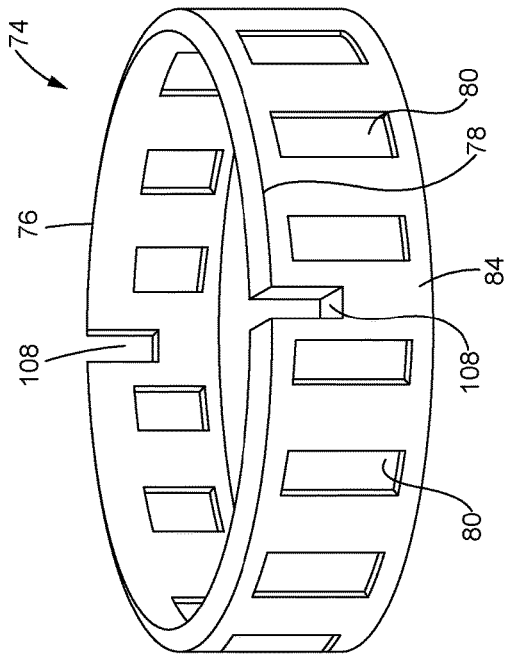

FILTER FOR A FUEL INJECTOR

TECHNICAL FIELD

This disclosure generally relates to a fuel injector and, more particularly, to a filter for a fuel injector.

BACKGROUND

Generally speaking, fuel injectors include a first end and a second end opposite the first end, and a longitudinal axis extending therethrough. A control section may be located adjacent to the first end and an injection section may be positioned adjacent to the second end. The injection section may be configured to deliver metered amounts of fuel into a cylinder with which the fuel injector is associated. The control section, on the other hand, may regulate operation of the injection section through mechanical, electrical, electromechanical, hydraulic means, piezoelectric, or other means.

The injection section may include a fuel injection needle in tight tolerance with an injector outlet. Fuel from a fuel feed stream may pass between the injection needle and injector outlet during operation, and particles suspended in the fuel feed stream may rub or scuff the injector outlet or injection needle during operation, thereby leading to decreased fuel injector efficiency. Likewise, the control section may include a valve in tight tolerance with a valve body. When the valve is open, oil from an oil feed stream may pass by the valve from a first oil passageway to a second oil passageway. The oil feed stream may also include suspended particles that may rub or scuff the valve or valve body, also leading to decreased fuel injector efficiency.

Ordinarily, screen-based filters may be utilized with the fuel injector to remove particles in both the fuel feed stream and the oil feed stream. For example, German Patent Application DE102013201802 ('802) discloses a screen-based filter to remove suspended particles in a fuel feed stream. This filter includes an inner screen and an outer screen and a flow channel positioned between the inner screen and the outer screen. While certainly effective for its intended purpose, it has certain drawbacks. For example, when particles begin building on the screen, pressure on screen builds until the screen buckles. With enough pressure, the screen ruptures and particles flow through the filter causing rubbing and scuffing on injector parts, thereby causing decreased fuel injector efficiency.

The present disclosure is directed to overcoming one or more problems set forth above and/or other problems associated with the prior art.

SUMMARY

In accordance with one aspect of the present disclosure, a fuel injector filter is disclosed. The fuel injector filter may include an inner ring concentrically surrounded by an outer ring. The inner ring may radially extend between an inner ring inner perimeter and an inner ring outer perimeter, and comprise a first port radially extending between the inner ring inner perimeter and the inner ring outer perimeter. The outer ring may radially extend between an outer ring inner perimeter and an outer ring outer perimeter, and comprise a first aperture radially extending between the outer ring inner perimeter and the outer ring inner perimeter. The first aperture may be circumferentially offset from the first port. A filtration channel may radially extend between the inner ring outer perimeter and the outer ring inner perimeter and be configured to impede movement of a particle toward the first port.

In accordance with another aspect of the present disclosure, a fuel injector is disclosed. The fuel injector may include a first end, a second end opposite the first end, and a longitudinal axis extending through the first end and the second end. The fuel injector may also include a fuel inlet, and a fuel injector filter may concentrically surround the fuel inlet. The fuel injector filter may include an inner ring concentrically surrounded by an outer ring. The inner ring may radially extend between an inner ring inner perimeter and an inner ring outer perimeter, and comprise a first port radially extending between the inner ring inner perimeter and the inner ring outer perimeter. The outer ring may radially extend between an outer ring inner perimeter and an outer ring outer perimeter, and comprise a first aperture radially extending between the outer ring inner perimeter and the outer ring inner perimeter. The first aperture may be circumferentially offset from the first port. A filtration channel may radially extend between the inner ring outer perimeter and the outer ring inner perimeter and be configured to impede movement of a particle toward the first port.

In accordance with another embodiment of the present disclosure, a method of purifying a feed stream for a fuel injector with a fuel filter, the feed stream including fuel and a suspended particle, is disclosed. The method may include entering by the feed stream into an inlet side of an aperture of an outer ring, and exiting by the feed stream out of an outlet side of the aperture of the outer ring. The method may also include entering by the fuel into a filtration channel, the filtration channel radially extending between an inner ring outer perimeter and an outer ring inner perimeter. Further, the method may include stopping the suspended particle at a junction between the outlet side of the aperture, the inner ring outer perimeter, and the filtration channel, thereby preventing movement of the suspended particle into the filtration channel, passing the fuel through a port in an inner ring and into the fuel injector.

These and other aspects and features of the present disclosure will be more readily understood when read in conjunction with the accompanying drawings.

BRIEF DESCRIPTION

FIG. 9 is a perspective view of an inner ring in accordance with the present disclosure.

FIG. 10 is a perspective view of an outer ring in accordance with the present disclosure.

FIG. 11 is a perspective view of an outer ring in accordance with the present disclosure.

DETAILED DESCRIPTION OF THE DISCLOSURE

Figure 1:
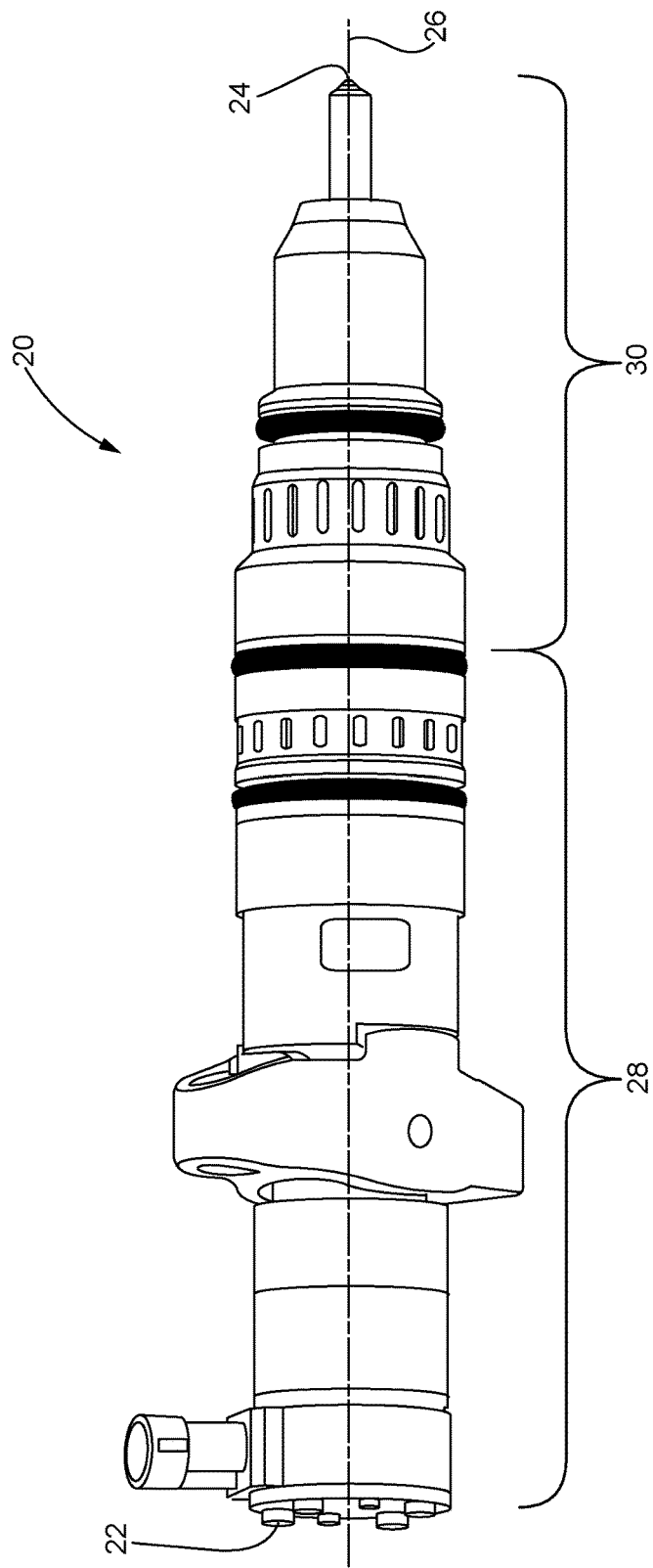
FIG. 1 is side view of a fuel injector in accordance with the present disclosure.

Various aspects of the disclosure will now be described with reference to the drawings, wherein like reference numbers refer to like elements, unless specified otherwise. Referring now to the drawings and with specific reference to FIG. 1, a fuel injector is disclosed and generally referred to by reference numeral 20. The fuel injector 20 may include a first end 22, a second end 24 opposite the first end 22, and a longitudinal axis 26 extending through the first end 22 and the second end 24. A control section 28 may be located adjacent the first end 22 and an injection section 30 may be positioned adjacent the second end 24.

Figure 2:
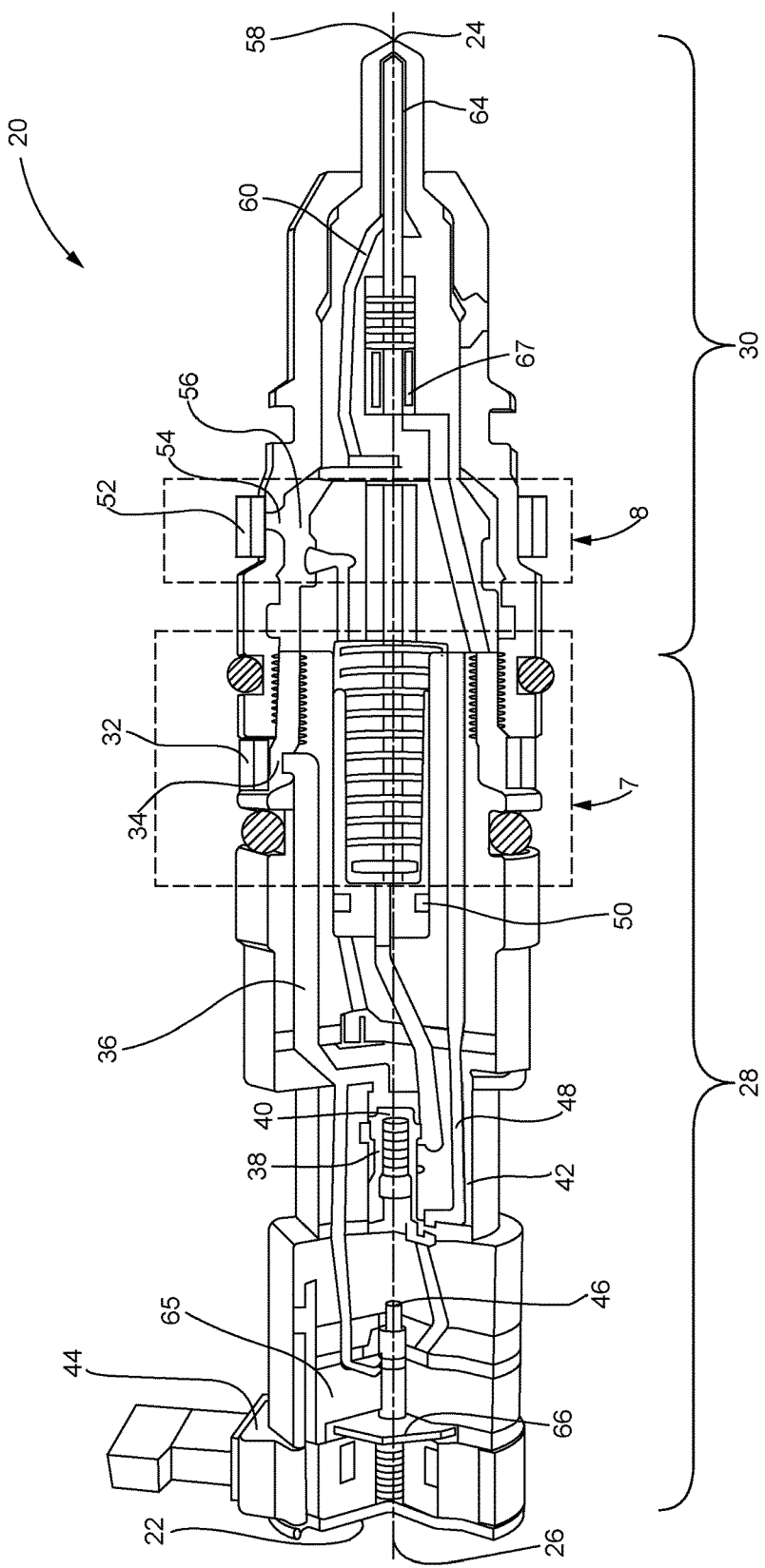
FIG. 2 is a cross-sectional view of the fuel injector according to FIG. 1.

Turning to FIG. 2, the control section 28 may include an oil filter 32 surrounding an oil inlet 34. A first oil passageway 36 may fluidly connect the oil inlet 34 with a first valve 46 slidingly engaged in tight tolerance with a first bore 46 of a valve body 65. The first valve 46 may be operably coupled to an actuator 44, such as a solenoid, via a connecting element armature 66. A second oil passageway 48 may fluidly connect the oil inlet 34 to an injector actuator 67 via the first oil passageway 36 and the first bore 46. The actuator 44 may slidingly reciprocate the first valve 46 in the first bore 65 between an open position and a closed position. In the open position oil may flow through the oil inlet 34, the first oil passageway 36, the first bore 65, valve seat of valve 46 and the second oil passageway 48 toward the injector actuator 38 and bore 40, thereby placing oil pressure on the injector actuator 50 and pushing fuel through passage 60 to get a needle valve 64 lift for fuel injection to start . In the closed position, oil may be redirected to flow past the first bore 65 and through the second oil passageway 48 toward the injector actuator 67 in order to force the closing of the needle valve 64, thereby the oil used to actuate actuator 50 may return and drain oil pressure on the injector actuator 50.

The injector section 30 may include a fuel filter 52 surrounding a fuel inlet 54. A fuel chamber 56 may be positioned adjacent to the fuel inlet 54 and my fluidly connect the fuel inlet to an injector outlet 58 via a fuel passageway 60 and a needle bore 64. An injection needle 64 may slidingly reciprocate in within and in tight tolerance with the needle bore 60 between an injection position and a non-injection position. In the injection position, the needle may slidingly move away from the injector outlet 58 thereby allowing fuel to pass through the fuel inlet 54, the fuel chamber 56, the fuel passageway 60, the needle bore 64, and out the injector outlet 58 and into a cylinder with which the fuel injector 20 is associated. In the non-injection position, the injection needle 64 may be in tight tolerance with and be seated in the injector outlet 58, thereby preventing the flow of fuel between the fuel inlet 54 and into the cylinder with which the fuel injector 20 is associated.

Both the oil and the fuel passing into the fuel injector 20 may include suspended particles. Particles suspended in the oil may rub or scuff the first valve 46 or the first bore 65, thereby allowing oil to pass into the oil passageway 48 while the first valve 46 is in the closed position. The particles can also sieze actuator 40, not letting enough oil to feed actuator 50 and also actuator 67 could sieze and not allowing the injector needle 64 to open. Likewise, the particles suspended in the fuel may rub or scuff the injection needle 64 and the injector outlet 58, thus allowing fuel to pass into the cylinder when the needle 64 is in the non-injection position.

Figure 3:
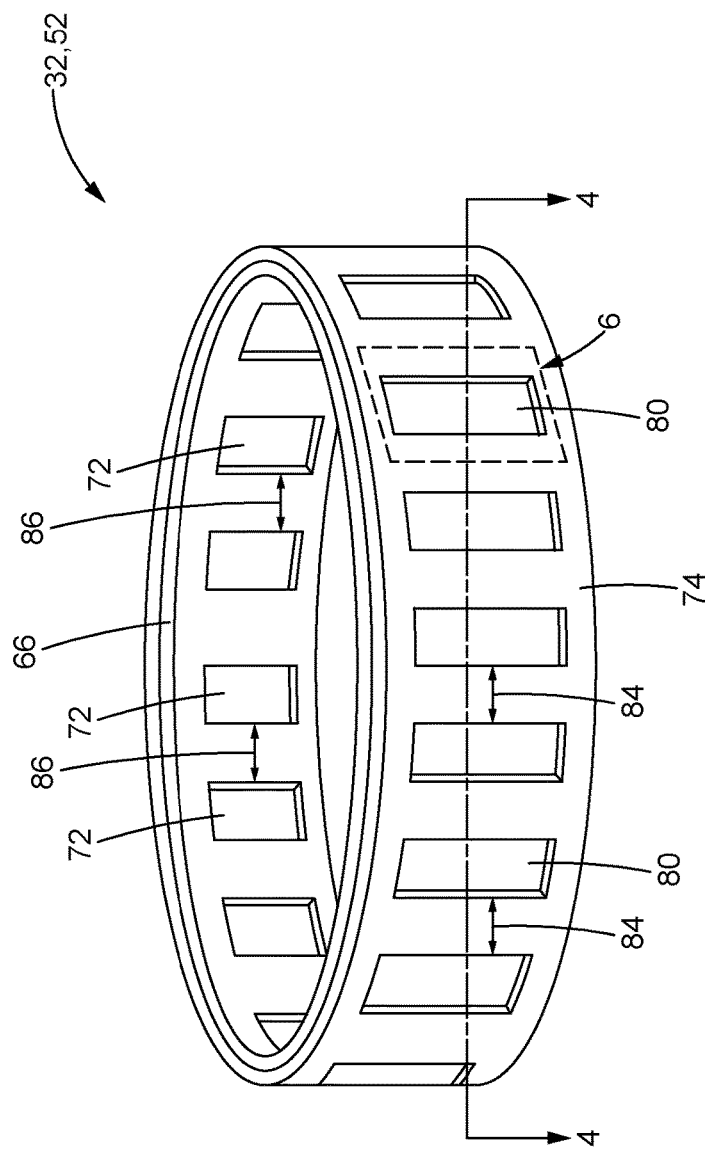
FIG. 3 is a perspective view of a fuel injector filter in accordance with the present disclosure.
Figure 4:
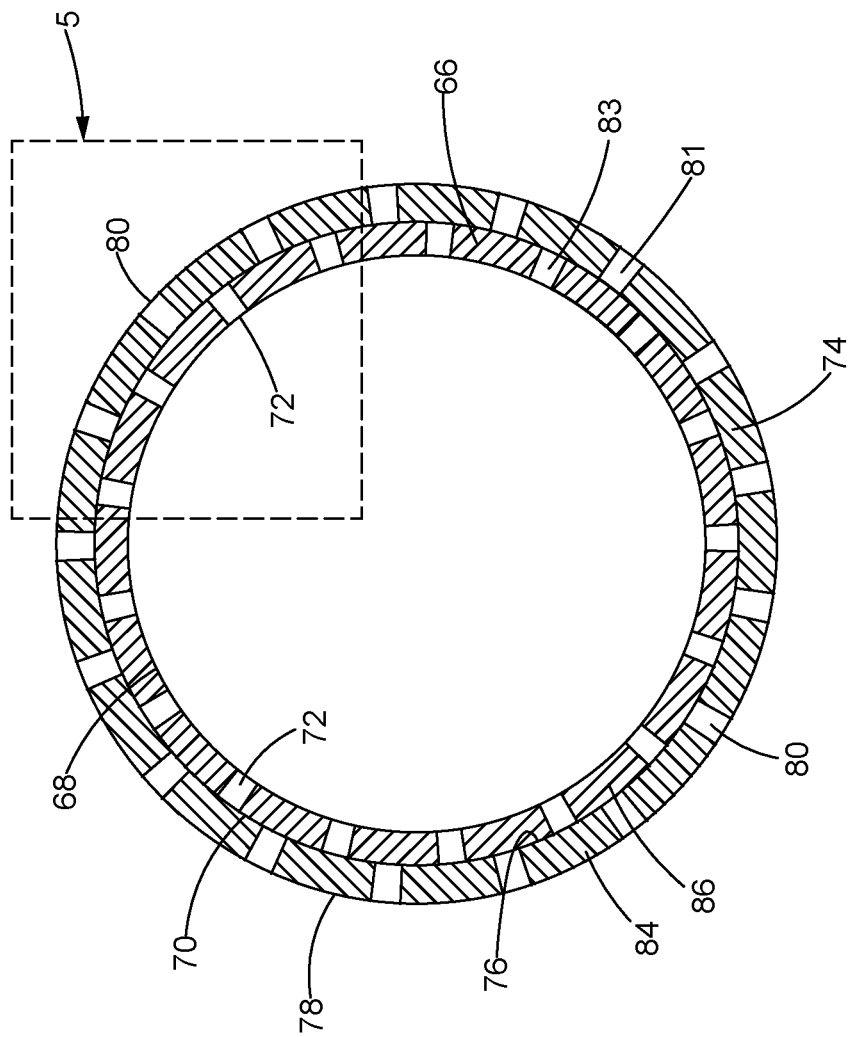
FIG. 4 is a cross-sectional view of the fuel injector along line 4-4 of FIG. 3.
Figure 5:
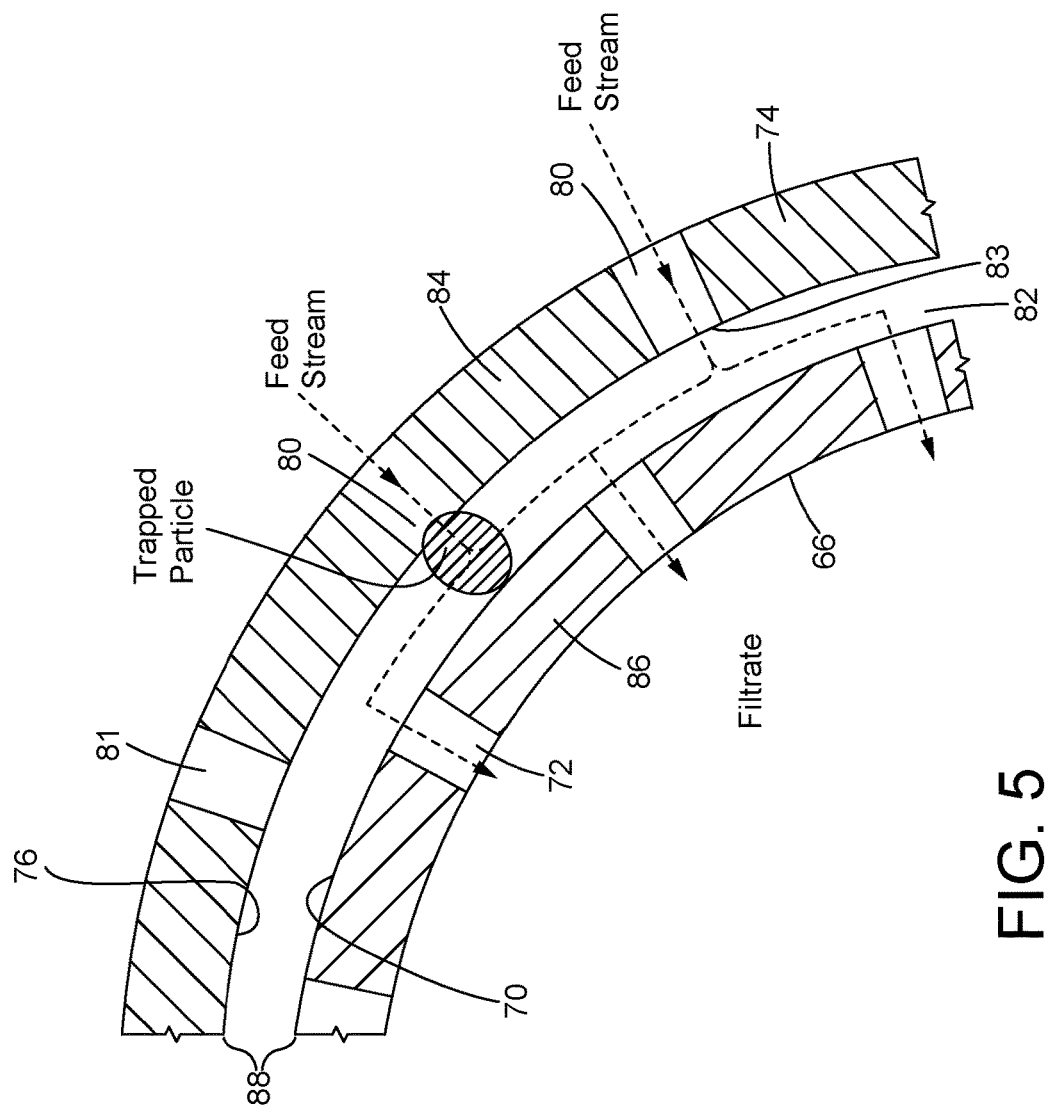
FIG. 5 is an enlarged view of portion 5 of FIG. 4.

The present disclosure is directed toward an oil filter 32 and a fuel filter 52 constructed in accordance with FIGS. 3-14. As illustrated in FIGS. 3-4, the filter 32, 52 may include an inner ring 66 radially extending between an inner ring inner perimeter 68 and an inner ring outer perimeter 70. The inner ring 66 may include a plurality of ports 72 radially extending between the inner ring inner perimeter 68 and the inner ring outer perimeter 70. The filter 32, 52 may also include an outer ring 74 concentrically surrounding the inner ring 66. The outer ring 74 may radially extend between an outer ring inner perimeter 76 and an outer ring outer perimeter 78, and include a plurality of apertures 80 radially extending between the outer ring inner perimeter 76 and the outer ring outer perimeter 78. Turning to FIG. 5, a filtration channel 82 may radially extend between the inner ring outer perimeter 70 and the outer ring inner perimeter 76. The filtration channel 82 may be configured to impede movement of a particle toward the plurality of ports 72.

As illustrated in each of FIGS. 3-5, each aperture of the plurality of apertures 80 may be circumferentially offset set from each other with respect to the outer ring outer perimeter 78, with an upright 84 extending between each adjacent aperture of the plurality of apertures 80. Each aperture of the plurality of apertures 80 may include an inlet side 81 positioned at the outer ring outer perimeter 78, and an outlet side 83 positioned at the outer ring inner perimeter 76. Further, each port of the plurality of ports 72 may be circumferentially offset from each other with respect to the outer ring perimeter 78, and include a wall 86 extending between each adjacent port of the plurality of ports 72.

Each port of the plurality of ports 72 may also be circumferentially offset from each adjacent aperture of the plurality of apertures 80 with respect to the outer ring outer perimeter 78. Thus, each port of the plurality of ports 80 may be circumferentially positioned between adjacent apertures of the plurality of apertures 80. In other words, each port of the plurality of ports 72 may be circumferentially aligned with an upright 84 extending between adjacent apertures of the plurality of apertures 80 with respect to the outer ring outer perimeter 78. As such, each wall of extending between adjacent ports of the plurality of ports 72 may be circumferentially aligned with an upright 84 extending between adjacent apertures of the plurality of apertures 80 with respect to the outer ring outer perimeter 78.

Figure 6:
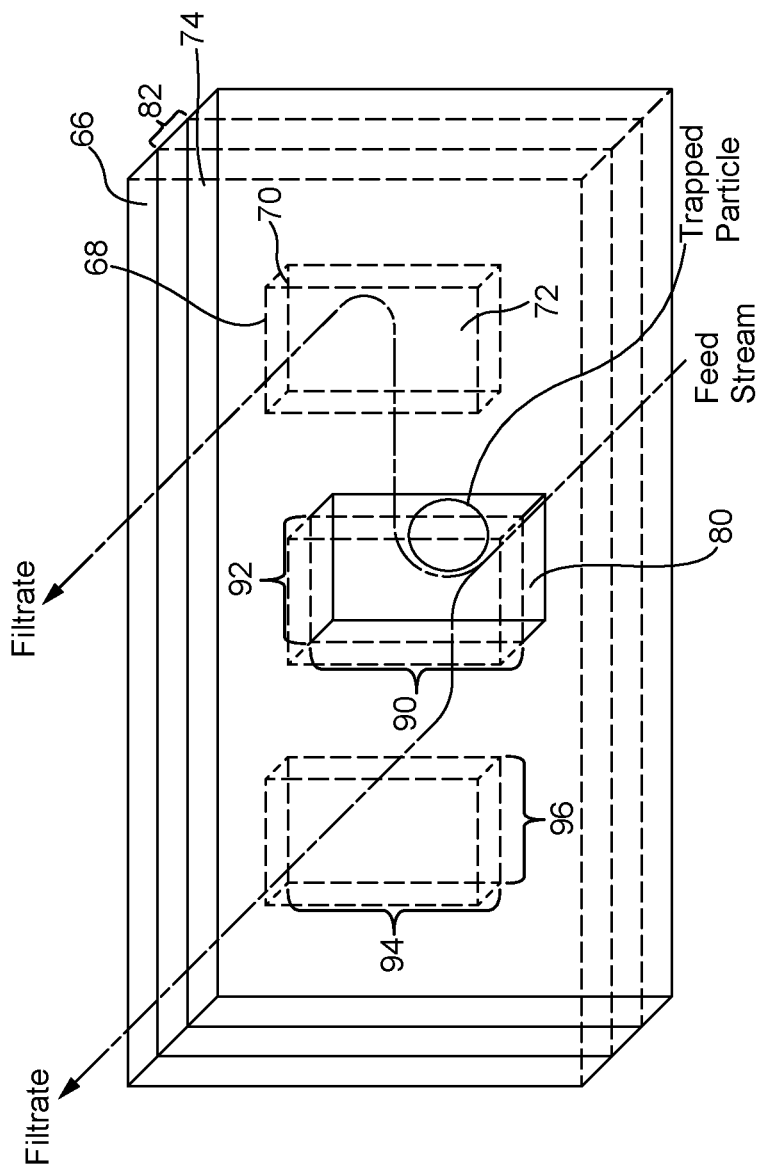
FIG. 6 is an enlarged in-phantom view of a portion of 6 of FIG. 3.

Referring now to FIGS. 5-6, the filtration channel 82 may be further defined by a channel width 88, which may be the distance between the inner ring outer perimeter 70 and the outer ring inner perimeter 76. The channel width 88 may be less than or equal to a predetermined width defined by a particle diameter of the particle suspended in an oil or fuel feed stream. For example, in the instance the filter 32, 52 is utilized as an oil filter 32, the channel width 84 may be less than or equal to 300 µm. In a more preferred embodiment, when the filter 32, 52 is utilized as an oil filter, the channel width may be less than or equal to 200 µm and greater than or equal to 100 µm. In the instance the filter 32, 52 is utilized as a fuel filter 52, the channel width 84 may be less than or equal to 200 µm. In a more preferred embodiment, when the filter 32, 52 is utilized as a fuel filter 52, the channel width 84 may be less than or equal to 200 μm and greater than or equal to 50 μm.

Now referring specifically to FIG. 6, each aperture of the plurality of apertures 80 may comprise an aperture height 90 and an aperture width 92, and at least one of the aperture height 90 and the aperture width is greater than or equal to the predetermined width. For example, when the filter 32, 52 is utilized as an oil filter 32, at least one of the aperture height 90 and the aperture width 92 may be greater or equal to 100 μm. In another embodiment, when the filter 32, 52 is utilized as an oil filter, at least one of the aperture height 90 and the aperture width 92 is greater than or equal to 200 μm. In an additional embodiment, when the filter 32, 52 is utilized as an oil filter, at least one of the aperture height 90 and the aperture width 92 may be greater or equal to 300 μm. In the instance the filter 32, 52 is used as a fuel filter 52, at least one of the aperture height 90 and the aperture width 92 is greater than or equal to 50 μm and less than or equal to 100 μm. In another embodiment, when the filter 32, 52 is used as a fuel filter 52, at least one of the aperture height 90 and the aperture width 92 is greater than or equal to 200 μm.

Each port of the plurality of ports 72 may comprise a port height 94 and a port width 96, and at least one of the port height 94 and the port width 96 may be less than or equal to the predetermined width. For example, when the filter 32, 52 is utilized as an oil filter 32, at least one of the port height 94 and the port width 95 may be less than or equal to 100 μm. In another embodiment, when the filter 32, 52 is utilized as an oil filter, at least one of the port height 94 and the port width 96 may be less than or equal to 200 μm. In an additional embodiment, when the filter 32, 52 is utilized as an oil filter, at least one of the port height 94 and the port width 96 may be less or equal to 300 μm. However, in the instance the filter 32, 52 is used as a fuel filter 52, at least one of the port height 94 and the aperture width 96 may be less than or equal to 50 μm and less than or equal to 100 μm. In another embodiment, when the filter 32, 52 is used as a fuel filter 52, at least one of the port height 94 and the port width 96 may be less than or equal to 200 μm.

Figure 7:
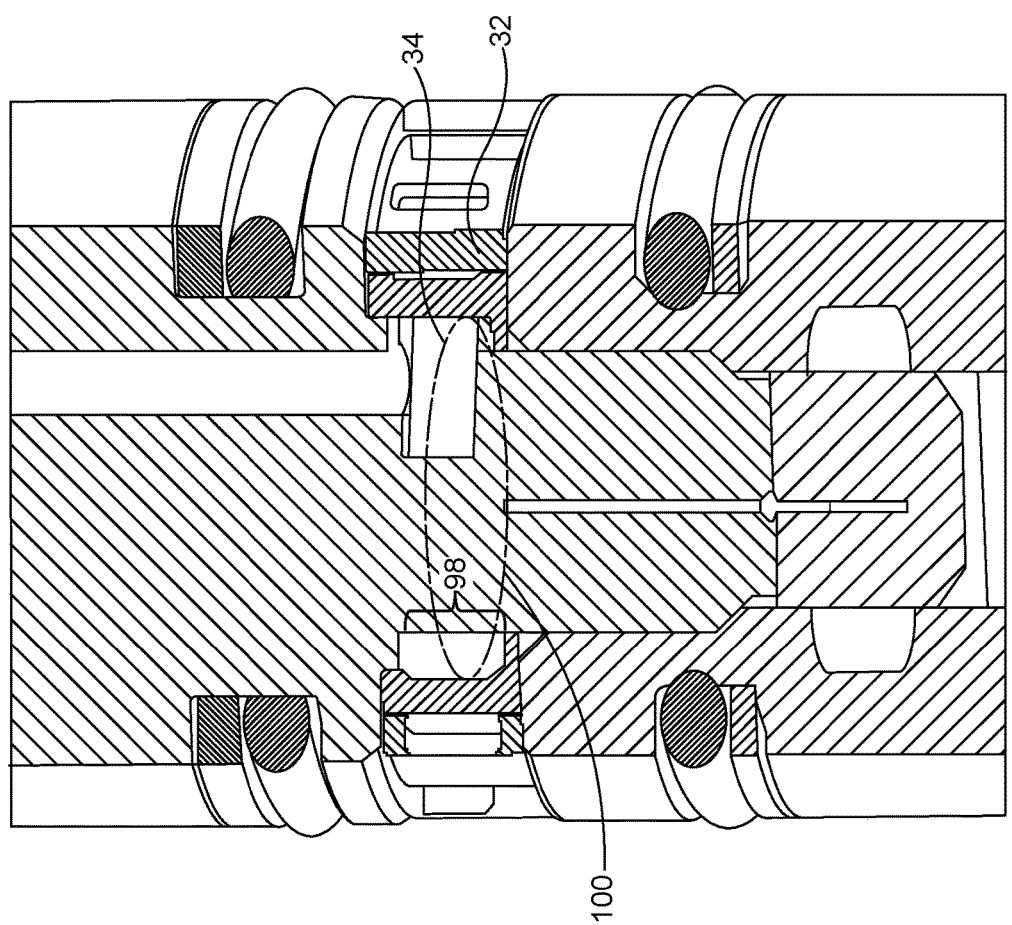
FIG. 7 is an enlarged cross-sectional view of portion 7 of FIG. 2.

Referring to FIG. 7, an enlarged cross-sectional view of the oil inlet of FIG. 2 is depicted. As is illustrated therein, the oil inlet 34 may include an oil inlet width 98 and an oil inlet circumference 100. The product of the oil inlet width 98 and oil inlet circumference 100 may define an oil inlet surface area. In one embodiment, when the filter 32, 52 is used as an oil filter 32, the sum of the surface area of each aperture of the plurality of apertures 80, wherein the surface area of each aperture is defined as the product of the aperture height 90 and the aperture width 92, is greater than or equal to the oil inlet surface area. In another embodiment, when the filter 32, 52 is used as an oil filter 32, the sum of the surface area of each port of the plurality of ports 72, wherein the surface are of each port is defined as the product of the port height 94 and the port width 96, is greater than or equal to the oil inlet surface area. Otherwise, the oil filter 32 would starve the flow of oil into the oil inlet 34.

Figure 8:
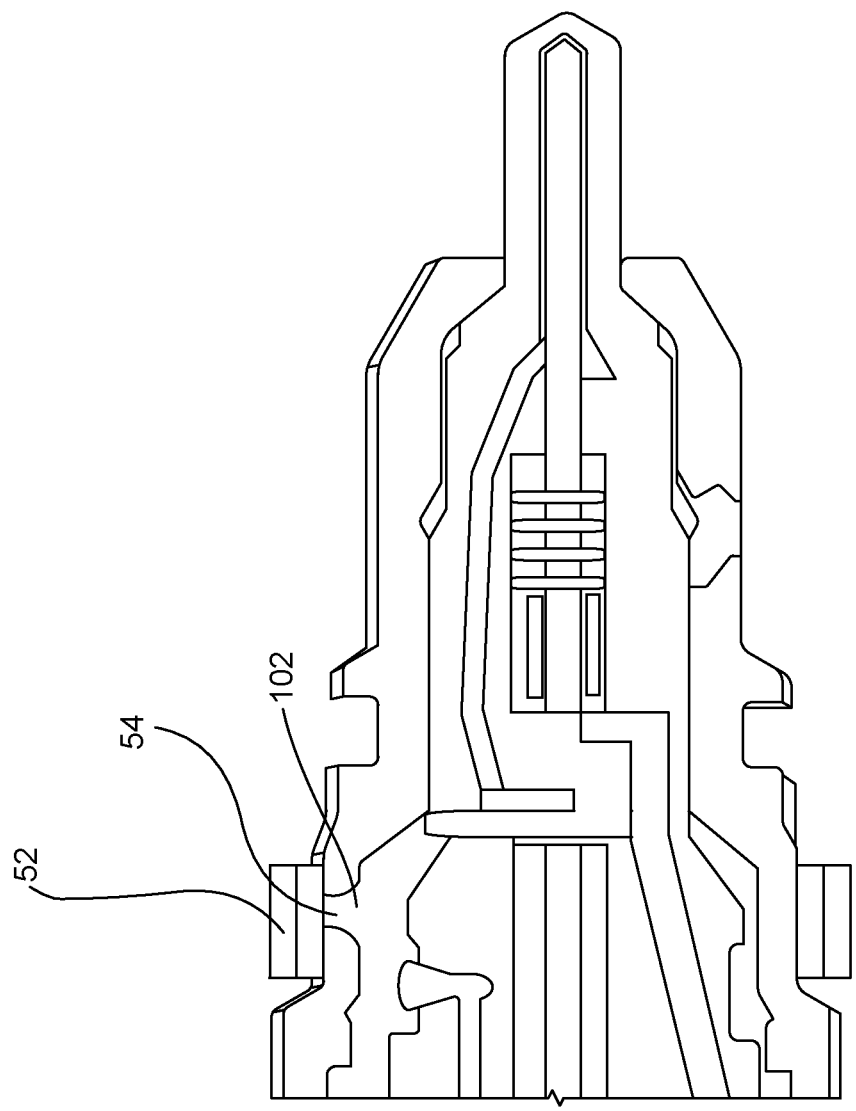
FIG. 8 is an enlarged cross-sectional view of portion 8 of FIG. 2.

Turning to FIG. 8, an enlarged cross-sectional view of the fuel inlet 54 is depicted. As seen there, the fuel inlet 54 may be a port defining a fuel inlet surface area 102. In one embodiment, when the filter 32, 52 is used as a fuel filter 52, the sum of the surface area of each aperture of the plurality of apertures 80, wherein the surface area of each aperture is defined as the product of the aperture height 90 and the aperture width 92, is greater than or equal to the fuel inlet surface area 102. In another embodiment, when the filter 32, 52 is used as a fuel filter 52, the sum of the surface area of each port of the plurality of ports 72, wherein the surface are of each port is defined as the product of the port height 94 and the port width 96, is greater than or equal to the fuel inlet surface area 102. Otherwise, the fuel filter 52 would starve the flow of fuel into the fuel inlet 54.

Turning to FIGS. 9-11, one embodiment of locking the rotation of the inner ring 66 relative to the outer ring 74 is illustrated. As depicted in FIG. 9, the inner ring 66 may include an inner rib 104 extending radially outward from the inner ring outer perimeter 70. The inner rib 104 may be circumferentially positioned at least one wall 86 of the inner ring 66. Turning to FIG. 10, the outer ring 74 may include an outer groove 106 extending partially radially outward from the outer ring inner perimeter 76 that may be configured to receive the inner rib 104, thereby locking the rotation of the inner ring 66 relative to the outer ring 74. The outer groove 106 may be circumferentially positioned at least one upright 84 of the outer ring 74. Alternatively, and turning to FIG. 11, the outer ring 74 may include and outer slot 108 radially extending between the outer ring inner perimeter 76 and the outer ring outer perimeter 78, that may be configured to receive the inner rib 104 and thereby locking the rotation of the inner ring 66 relative to the outer ring 74. The outer slot 108 may be circumferentially positioned at least one upright 84 of the outer ring 74.

Figure 13:
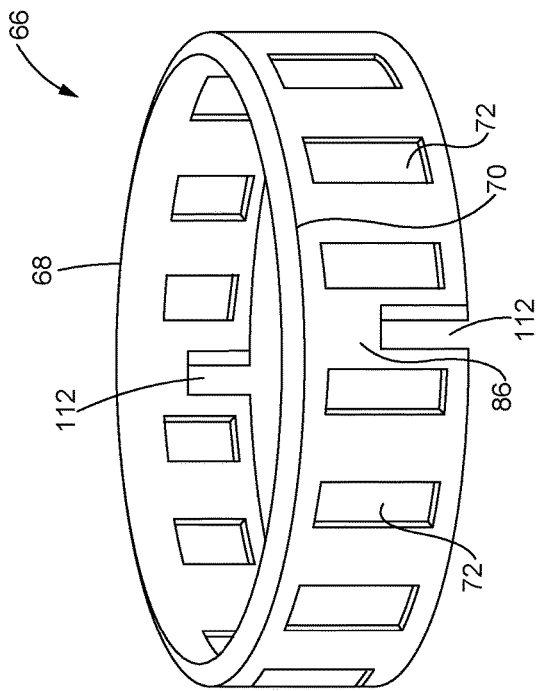
FIG. 13 is a perspective view of an inner ring in accordance with the present disclosure.
Figure 14:
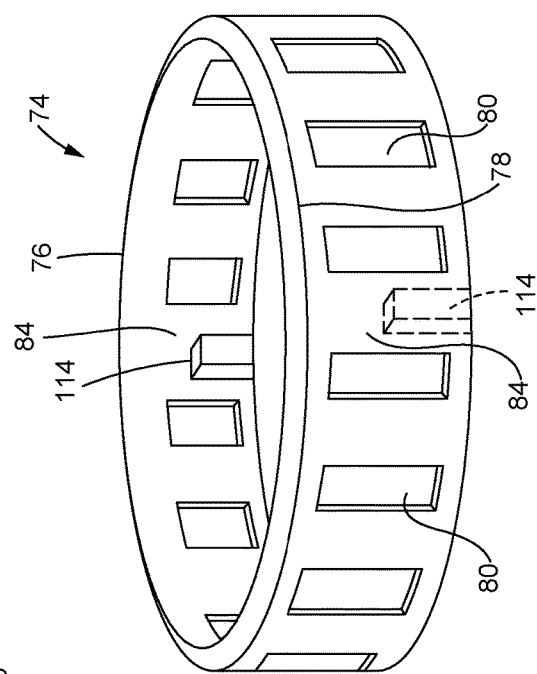
FIG. 14 is a perspective view of an outer ring in accordance with the present disclosure.
Figure 12:
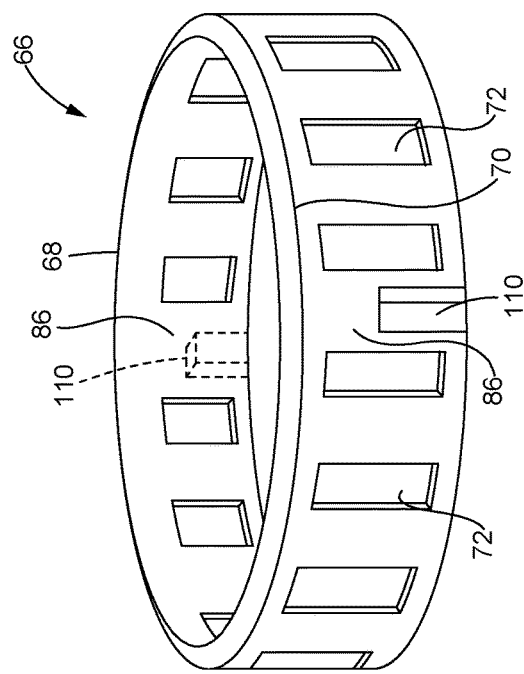
FIG. 12 is a perspective view of an inner ring in accordance with the present disclosure.
Figure 15:
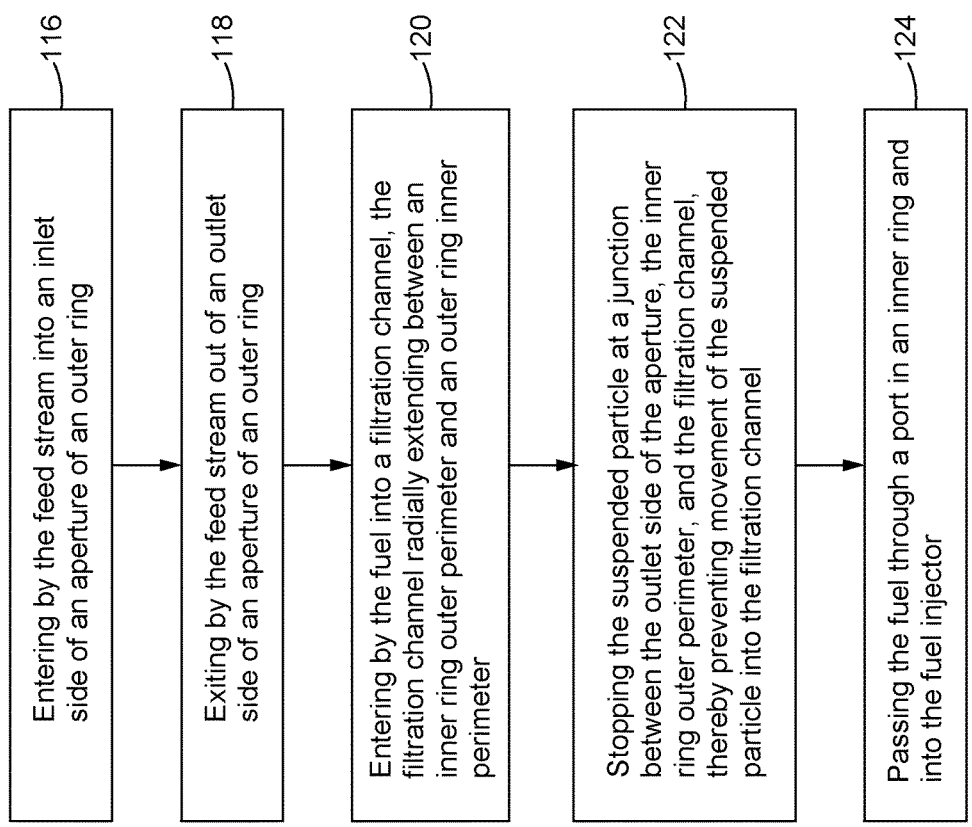
FIG. 15 is a flowchart depicting a sample sequence of steps for a purifying a feed stream for a fuel injector with a fuel filter, when the feed stream includes fuel and a suspended particle.

Referring to FIGS. 12-14, another embodiment of locking the rotation of the inner ring 66 relative to the outer ring 74 is depicted. As is seen in FIG. 12, the inner ring 66 may include an inner groove 110 extending partially radially inward from the inner ring outer perimeter 70 toward the inner ring inner perimeter 68. Circumferentially, the inner groove 110 may be positioned at the wall 86 of the inner ring 66. Instead, and turning to FIG. 13, the inner ring 66 may include an inner slot 112 radially extending between the inner ring inner perimeter 68 the inner ring outer perimeter 70. Turning to FIG. 14, the outer ring 74 may also include an outer rib 114 extending partially radially outward from the outer ring inner perimeter 76 toward the outer ring outer perimeter 78. Circumferentially, the outer rib 114 may be positioned at an upright 84. The outer rib 114 may be configured to receive either the inner groove 110 or the inner slot 112 of the inner ring 66, thereby locking the rotation of the inner ring 66 relative to the outer ring 74.

INDUSTRIAL APPLICABILITY

The disclosed filter finds potential in any fluid system requiring removal of a suspended particle from a feed stream. The disclosed filter finds particular applicability in fuel and oil filtration applications, for example, with fuel injectors configured to deliver liquid fuel or gaseous based fuel to a combustion cylinder, or with fuel injectors utilizing oil as a hydraulic means to regulate operation of the injection section. One skilled in the art will recognize, however, that the filter may be utilized in other functions that may or may not be associated with requiring removal of suspended particle from a feed stream, and other applications besides fuel injectors. Operation of the filter will now be described in more detail.

A feed stream, such as fuel for a fuel injector 20, may include a suspended particle that may rub or scuff the injection needle 64 or the injector outlet 58, thereby allowing fuel to pass into a cylinder with which the fuel injector 20 is associated when the needle 64 is in the non-injection position. Accordingly, as is depicted in FIG. 14, at step 116, the feed stream may enter into an inlet side 81 of an aperture of the plurality of apertures 80 of an outer ring 74. In an additional step 118, the feed stream may exit an outlet side 83 of the aperture of the plurality of apertures 80 of the outer ring 74. Subsequently, and as is depicted in step 120, the fuel may enter into a filtration channel 82, while as is depicted in step 122 the suspended particle may be stopped at a junction between the outlet side 83 of the aperture of the plurality of apertures 80, an inner ring outer perimeter 70, and the filtration channel 82, thereby stopping movement of the particle into the filtration channel 82. The filtration channel 82 may radially extend between the inner ring outer perimeter 70 and an outer ring inner perimeter 76. Next, as seen at step 124, the fuel may pass move through the filtration channel 82 and pass through a port of a plurality of ports 72 of an inner ring 66 and into the fuel injector 20. When the filter 32, 52 is utilized as an oil filter 52, the same process applies except that the feed stream contains oil and a suspended particle.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A fuel injector filter, comprising:
an inner ring radially extending between an inner ring inner perimeter and an inner ring outer perimeter, and comprising a first port radially extending between the inner ring inner perimeter and the inner ring outer perimeter;
an outer ring concentrically surrounding the inner ring and radially extending between an outer ring inner perimeter and an outer ring outer perimeter, comprising a first aperture radially extending between the outer ring inner perimeter and the outer ring outer perimeter, and the first aperture is circumferentially offset from the first port, wherein the first aperture has an aperture height and an aperture width; and
a filtration channel radially extending between the inner ring outer perimeter and the outer ring inner perimeter, wherein the filtration channel has a channel width defined by the distance between the inner ring outer perimeter and the outer ring inner perimeter, wherein the channel width is less than at least one of the aperture height and the aperture width so that the fuel injector filter is configured to impede movement of a particle having a predetermined width greater than the channel width toward the first port.

2. The fuel injector filter according to claim 1, the outer ring further comprising a second aperture radially extending between the outer ring inner perimeter and the outer ring outer perimeter, wherein the second aperture is circumferentially offset from the first aperture, and wherein the first port is circumferentially positioned between the first aperture and the second aperture.

3. The fuel injector filter according to claim 2, the outer ring further comprising an upright radially extending between the outer ring inner perimeter and the outer ring outer perimeter and circumferentially extending between the first aperture and the second aperture.

4. The fuel injector filter according to claim 1, the outer ring further comprising a second aperture radially extending between the outer ring inner perimeter and the outer ring outer perimeter, wherein the second aperture is circumferentially offset from the first aperture, the outer ring further comprising an upright radially extending between the outer ring inner perimeter and the outer ring outer perimeter and circumferentially extending between the first aperture and the second aperture, and wherein the first port is circumferentially aligned with the upright.

5. The fuel injector filter according to claim 1, wherein the predetermined width is 300 μm.

6. The fuel injector filter according to claim 1, wherein the predetermined with is 200 μm.

7. The fuel injector filter according to claim 1, the first port further comprising a port height and a port width, and wherein at least one of the port height and the port width is less than or equal to the predetermined width.

8. The fuel injector filter according to claim 1, the first port further comprising a port height and a port width, and wherein at least one of the port height and the port width is greater than or equal to the predetermined width.

9. A fuel injector, comprising:
a first end;
a second end opposite the first end;
a longitudinal axis extending through the first end and the second end;
a fluid inlet;
a fuel injector filter concentrically surrounding the fluid inlet, the fuel injector filter comprising an inner ring radially extending between an inner ring inner perimeter and an inner ring outer perimeter, the inner ring comprising a first port radially extending between the inner ring inner perimeter and the inner ring outer perimeter, the fuel injector filter further comprising an outer ring concentrically surrounding the inner ring, the outer ring radially extending between an outer ring inner perimeter and an outer ring outer perimeter, the outer ring further comprising a plurality of apertures radially extending between the outer ring inner perimeter and the outer ring outer perimeter, wherein each aperture of the plurality of apertures has an aperture height and an aperture width, wherein the first port is circumferentially positioned between adjacent apertures of the plurality of apertures, the fuel injector filter further comprising a filtration channel radially extending between the inner ring outer perimeter and the outer ring inner perimeter, wherein the filtration channel has a channel width defined by the distance between the inner ring outer perimeter and the outer ring inner perimeter, wherein the channel width is less than at least one of the aperture height and the aperture width so that the fuel injector filter is configured to impede movement of a particle having a predetermined width greater than the channel width toward the first port.

10. The fuel injector according to claim 9, the outer ring further comprising a plurality of uprights, each upright of the plurality of uprights radially extending between the outer ring inner perimeter and the outer ring outer perimeter, each upright of the plurality of uprights circumferentially extending between adjacent apertures of the plurality of apertures, and wherein the first port is circumferentially aligned with an upright of the plurality of uprights.

11. The fuel injector according to claim 9, wherein the fluid inlet is an oil inlet, and wherein the predetermined width is 300 μm.

12. The fuel injector according to claim 9, wherein the fluid inlet is a fuel inlet, and wherein the predetermined width is 200 μm.

13. The fuel injector according to claim 9, wherein the fluid inlet has a surface area, wherein the sum of the surface area of each aperture of the plurality of apertures, when the surface area of each aperture is defined as the product of the aperture height and the aperture width, is greater than or equal to surface area of the fluid inlet.

14. A method of purifying a feed stream for a fuel injector with a fuel filter, the feed stream including fuel and a suspended particle, comprising:
  entering by the feed stream into an inlet side of an aperture of an outer ring, wherein each aperture of the plurality of apertures has an aperture height and an aperture width;
  exiting by the feed stream out of an outlet side of the aperture of the outer ring;
  entering by the fuel into a filtration channel, the filtration channel radially extending between an inner ring outer perimeter and an outer ring inner perimeter, wherein the filtration channel has a channel width defined by the distance between the inner ring outer perimeter and the outer ring inner perimeter, and wherein the channel width is less than at least one of the aperture height and the aperture width;
  stopping the suspended particle having a predetermined width greater than the channel width at a junction between the outlet side of the aperture, the inner ring outer perimeter, and the filtration channel, thereby preventing movement of the suspended particle into the filtration channel; and
  passing the fuel through a port in an inner ring and into the fuel injector.

15. The method according to claim 14, wherein the outer ring concentrically surrounds the inner ring.

16. The method according to claim 14, wherein the port is circumferentially offset from the aperture.

* * * * *